(12) United States Patent
Reeder et al.

(10) Patent No.: US 6,539,007 B1
(45) Date of Patent: Mar. 25, 2003

(54) SYSTEM AND METHOD FOR MULTIPLE SINGLE-PHASE ACCESS IN A TDMA WIRELESS NETWORK

(75) Inventors: Paul I. Reeder, Greenville, TX (US); Tae-Guen Park, Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/192,953

(22) Filed: Nov. 16, 1998

(51) Int. Cl.[7] .................................................. H04J 3/00
(52) U.S. Cl. ........................ 370/337; 370/347; 370/442; 370/458
(58) Field of Search ................................. 370/280, 337, 370/347, 276, 294, 301, 310, 431, 437, 442, 458; 714/699; 375/219, 240; 455/403, 39

(56) References Cited

U.S. PATENT DOCUMENTS

| | | | | |
|---|---|---|---|---|
| 5,502,723 A | * | 3/1996 | Sanders ...................... 370/60.1 |
| 5,530,700 A | * | 6/1996 | Tran et al. ................... 370/461 |
| 5,638,374 A | * | 6/1997 | Heath .......................... 370/322 |
| 5,729,541 A | * | 3/1998 | Hamalainen et al. ....... 370/337 |
| 5,809,015 A | * | 9/1998 | Elliott et al. ................. 370/280 |
| 5,923,266 A | * | 7/1999 | Wang et al. ................. 370/310 |
| 6,016,311 A | * | 1/2000 | Gilbert et al. ............... 370/280 |
| 6,157,627 A | * | 12/2000 | Olofsson et al. ............. 370/329 |
| 6,240,076 B1 | * | 5/2001 | Kanerva et al. ............. 370/330 |
| 6,266,702 B1 | * | 7/2001 | Darnell et al. ............... 709/236 |

OTHER PUBLICATIONS

Oono, T. et al "Dynamic Slot Allocation Technology for Mobile Multi–Media TDMA Systems Using a Distributed Control Scheme" Universal Personal Communications Record, vol. 1, Oct. 12–16, 1997, pp. 74–78.*

Turina, D. et al "A Proposal for Multi–Slot MAC Layer Operation for Packet Data Channel in GSM" Universal Personal Communications, vol. 2, Sep. 29–Oct. 2, 1996, pp. 572–576.*

Chen, L. et al "A Dynamic Channel Assignment Algorithm for Asymmetric Traffic in Voice/Data Integrated TDMA/TDD Mobile Radio" Information, Communications and Signal, vol. 1, Sep. 9–12, 1997, pp. 215–219.*

Chen, L. et al "Dynamic Timeslot Allocation Suitable for Asymmetric Traffic in Multimedia TDMA/TDD Celluar Radio" Vehicular Technology Conference, vol. 2, May 18–21, 1998, pp. 1424–1428.*

* cited by examiner

*Primary Examiner*—Hassan Kizou
*Assistant Examiner*—Anh-Vu H Ly

(57) ABSTRACT

A communications device for receiving data from a base station in up to N phases, including in one phase, all phases, or multiple phases. The multi-phase mode captures data from all phases and discards all but selected phases assigned to the wireless communications device. The wireless communications device may have different network addresses within each phase and the phases and network addresses may be modified during operation. The wireless communications device includes 1) a receiver for receiving a TDMA signal transmitted from a base station, the TDMA signal having user data streams arranged in N phases, and 2) a data controller for processing the user data streams in a multi-phase mode, wherein the data controller retrieves from M selected phases at least one user data stream directed to the wireless communications device, where M may be greater than 1 and is less than N.

18 Claims, 6 Drawing Sheets

| DEVICE ADDRESS | PHASE 1 | PHASE 2 | PHASE 3 |
|---|---|---|---|
| 000 | A | I | M |
| 001 | B | J | N |
| 010 | C | A | J |
| 011 | D | K | O |
| 100 | E | B | P |
| 101 | F | F | Q |
| 110 | G | L | R |
| 111 | H | M | S |

SYSTEM AND METHOD FOR MULTIPLE SINGLE-PHASE ACCESS IN A TDMA WIRELESS NETWORK

TECHNICAL FIELD OF THE INVENTION

The present invention is directed, in general, to wireless communications networks and, more specifically, to a time division multiple access system capable of providing multiple single-phase access.

BACKGROUND OF THE INVENTION

The field of wireless communications encompass a variety of products, including personal devices such as pagers, cellular phones, and PCS phones, and information systems, such as wireless LANs (local area networks) and smaller wireless office networks. These products are widely used due to their convenience and comparatively low cost. This widespread usage has greatly burdened the available RF bandwidth used by these devices.

To maximize usage of the available bandwidth, a number of multiple access technologies have been implemented to allow more than one subscriber to communicate simultaneously with each base transceiver station (BTS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

TDMA technology is used in wireless computer networks, paging (or wireless messaging) systems, and cellular telephony. In a TDMA protocol, each device (e.g., pager, cell phone, laptop PC) receives and/or transmits data in an assigned channel that corresponds to a specific time slot (or phase) in a specific frequency bandwidth (typically 30 KHz wide).

Additionally, addresses may be used within each channel to distinguish between users and to increase thereby the number of users that a TDMA wireless network may serve at one time. This is particularly true in paging systems and wireless LANs, where a mobile unit (e.g., pager or laptop PC) does not continually receive data traffic from a network BTS, but rather receives data traffic in large bursts that are separated by periods of inactivity. Thus, for example, a pager having address "7" will only respond to data if the data is received in the correct frequency bandwidth and in the correct phase (time slot), and if the data has the correct address (i.e., "7") in the header.

Within a selected frequency bandwidth, a TDMA user device may be assigned to receive data sent to the correct address in one fixed phase/time slot. This operating mode is sometimes referred to as "single phase" operation. For example, if the pager or computer used by User A is operating in single-phase mode, the device may receive only data that is sent to Address 4 in Phase 1 of Frequency Band X.

Alternatively, a TDMA user device may be assigned to receive data sent to the correct address in one phase/time slot that may vary. This operating mode is sometimes referred to as "any phase" operation. For example, if the pager or computer used by User A is operating in any-phase mode, the device may receive data sent to Address 4 in Phase 1 of Frequency Band X at one point in time, but at another point in time may receive data sent to Address 4 in Phase 2 of the same Frequency Band X. In this manner, if a large number of user addresses are added to the wireless network in Phase 1, the wireless network can use the any-phase mode to send data to User A in Phase 2.

Finally, a TDMA user device may be assigned to receive data sent to the correct address in all of the phases/time slots. This operating mode is sometimes referred to as "all phase" operation. For example, if the pager or computer used by User A is operating in all-phase mode, the device receives all data sent to Address 4 in Phases 1, 2 and 3 of Frequency Band X. This mode allows a large amount of data to be sent in a relatively short period of time to a single device, by is rarely used because it limits the number of users that may access the wireless network.

The prior art systems do not provide sufficient flexibility to allow a wireless mobile unit to receive data in more than one phase, but less than all of the phases, as in the case of all-phase mode. Typically, if a BTS sends data in more than one phase to a mobile device, the mobile device defaults to an all-phase mode of operation. This causes the mobile device to receive and to process data in every phase, including phases that do not contain data intended for the mobile device.

Furthermore, the prior art systems do not provide sufficient flexibility to allow a wireless mobile unit to receive data sent to different addresses in multiple phases. The address of a mobile unit in the prior art systems is always the same in each phase, whether the mobile unit is operating in single phase mode, any phase mode, or all phase mode.

There is therefore a need in the art for wireless networks and wireless devices that allow the wireless device to receive data in more than one phase, but less than all of the phases, as in the case of all-phase mode. There is a further need in the art for wireless networks and wireless devices that allow the wireless device to receive data sent to different addresses in multiple phases.

SUMMARY OF THE INVENTION

To address the above-discussed deficiencies of the prior art, it is a primary object of the present invention to provide, for use in a TDMA wireless communications network, a communications device that is capable of receiving data from a base station in a variable number of up to N phases, including one phase (single phase mode), N phases (all phase mode), and M phases (multi-phase mode), where M is less than N. The present invention implements the multi-phase mode of operation by capturing data from all phases (as in all phase mode) and discarding data from all phases except selected phases that are assigned to the wireless communications device. Furthermore, the wireless communications device can also be assigned different network addresses within each assigned phase, and both the assigned phase(s) and the assigned network address9es) can be modified "on-the-fly" by the base station during routine operations.

Accordingly, in one embodiment of the present invention, there is provided, for use in a time division multiple access (TDMA) wireless network, a wireless communications device comprising 1) a receiver capable of receiving a TDMA signal transmitted from a base station in the wireless network, the TDMA signal comprising a plurality of user data streams arranged in N phases; and 2) a data controller capable of processing the user data streams in a multiphase mode, the multi-phase mode enabling the data controller to retrieve from M selected ones of the N phases of the TDMA signal at least one user data stream directed to the wireless communications device, where M may be greater than 1 and is less than N.

In another embodiment of the present invention, the data controller retrieves user data streams from all N phases and processes only data retrieved from the M selected phases.

In still another embodiment of the present invention, a value of M is modifiable.

In yet another embodiment of the present invention, the value of M is modified by the base station.

In a further embodiment of the present invention, the data controller determines a transmitted user address associated with the at least one retrieved user data stream and processes the at least one retrieved user data stream if the transmitted user address is the same as an assigned user address associated with the wireless communications device.

In a yet further embodiment of the present invention, the assigned user address is modifiable by the base station.

In a still further embodiment of the present invention, the data controller determines a first transmitted user address associated with a first one of the at least one retrieved user data stream and a second transmitted user address associated with a second one of the at least one retrieved user data stream and processes the first and second retrieved user data streams if the first and second transmitted user addresses are the same as a first assigned user address and a second assigned user address associated with the wireless communications device.

In yet another embodiment of the present invention, the first assigned user address is different than the second assigned user address.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged TDMA wireless communications network.

Figure 1:
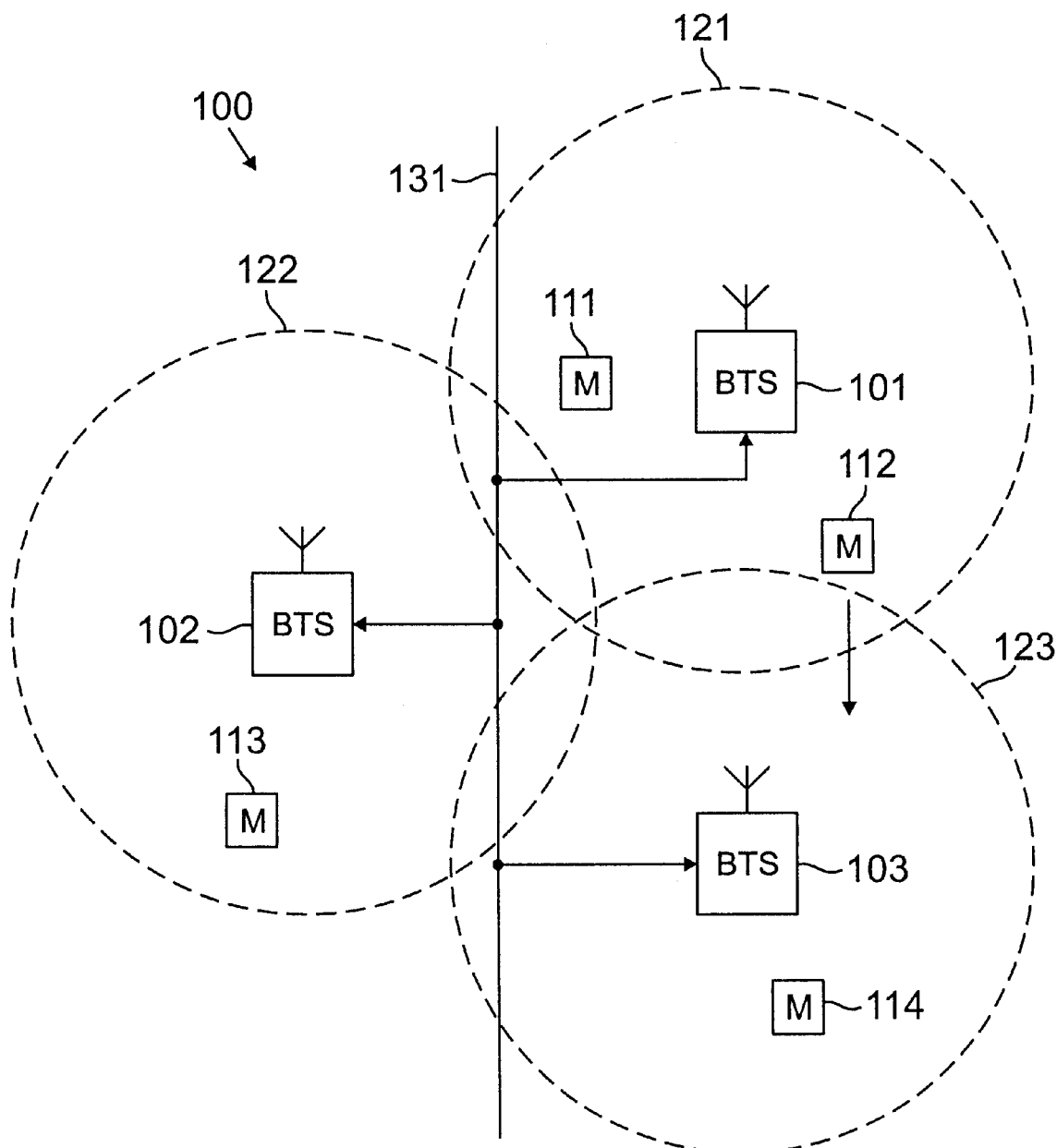
FIG. 1 illustrates an exemplary wireless network in accordance with one embodiment of the present invention.

FIG. 1 illustrates an exemplary wireless network 100 in accordance with one embodiment of the present invention. The wireless network 100 comprises a plurality of cell sites 121–123, each containing one of the base transceiver stations, BTS 101, BTS 102, or BTS 103. In a preferred embodiment of the present invention, the wireless telephone network 100 is a TDMA-based network. Base transceiver stations 101–103 are operable to communicate with a plurality of mobile units (M) 111–114. Mobile units 111–114 may be any suitable wireless devices, including conventional cellular telephones, PCS handset devices, portable computers, metering devices, and the like.

Dotted lines show the approximate boundaries of the cells sites 121–123 in which base transceiver stations 101–103 are located. The cell sites are shown approximately circular for the purposes of illustration and explanation only. It should be clearly understood that the cell sites may have other shapes, such as hexagonal, depending on the cell configuration selected and natural and man-made obstructions.

BTS 101, BTS 102 and BTS 103 transfer voice and data signals between each other and the public telephone system (not shown) via communications line 131. Communications line 131 may be any suitable connection means, including a T1 line, a T3 line, a fiber optic link, a network backbone connection, and the like. In some embodiments, BTS 101, BTS 102 and BTS 103 may be wirelessly linked to one another and/or the public telephone network by a satellite link.

In the exemplary wireless network 100, mobile unit 111 is located in cell site 121 and is in communication with BTS 101, mobile unit 113 is located in cell site 122 and is in communication with BTS 102, and mobile unit 114 is located in cell site 123 and is in communication with BTS 103. The mobile unit 112 is located in cell site 121, close to the edge of cell site 123. The direction arrow proximate mobile unit 112 indicates the movement of mobile unit 112 towards cell site 123. At some point as mobile unit 112 moves into cell site 123 and out of cell site 121, a "handoff" will occur.

A "handoff" is a well-known process for transferring control of a call from a first cell to a second cell. For example, if mobile unit 112 is in communication with BTS 101 and senses that the signal from BTS 101 is becoming unacceptably weak, mobile 112 may then switch to a BTS that has a stronger signal, such as the signal transmitted by BTS 103. Mobile unit 112 and BTS 103 establish a new communication link and a signal is sent to BTS 101 and the public telephone network to transfer the on-going voice and/or data signals through the BTS 103. The call is thereby seamlessly transferred from BTS 101 to BTS 103.

The base transceiver stations, BTS 101–BTS 103, communicate with mobile units 111, 112, 113 and 114 by means of a time division multiple access (TDMA) protocol. The TDMA protocol divides the available RF spectrum into a plurality of data traffic channels and one or more control channels. Each data traffic channel and control channel comprises a specific frequency band that is, for example, 30 kilohertz wide, and a specified phase (or time slot) within the specified frequency band. The mobile units transmit on one 30 KHz wide carrier frequency signal located at, for example, approximately 800 MHz, and receive on another 30 KHz wide carrier frequency signal located, for example, about 45 MHz higher.

BTS 101, BTS 102, and BTS 103 transmit control messages in a forward control channel to the respective ones of mobile units 111, 112, 113, and 114 and receive control messages in a reverse control channel from the mobile units. The control messages are transmitted in pre-determined control channels and are used to establish, to maintain, and to break down the data traffic communication links carrying the voice and/or data signals between the base transceiver stations and the mobile units. As will be described below in greater detail, BTS 101 through BTS 103 use forward control channels to send to mobile unit 111 through mobile unit 114 control messages that switch the operating modes of mobile units 111–114 to receive data in a data traffic channel in more than one phase at a time, using different network addresses, and without operating in an "all-phase" operating mode.

Figures 2, 3:
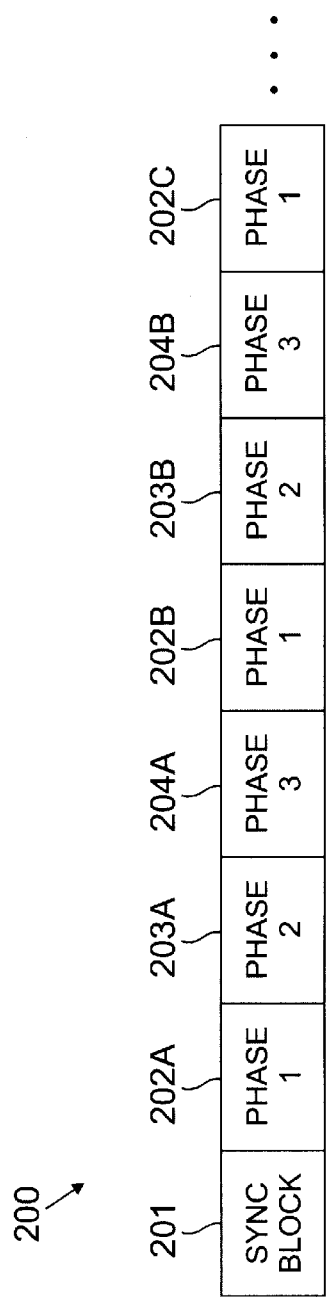
FIG. 2 is a timing diagram depicting exemplary TDMA data traffic in a wireless network in accordance with one embodiment of the present invention.
FIG. 3 illustrates phase and address assignments of a plurality of users in an exemplary wireless network in accordance with one embodiment of the present invention.

FIG. 2 is a timing diagram 200 depicting TDMA data traffic in exemplary wireless 100 network in accordance with one embodiment of the present invention. The TDMA traffic depicted in FIG. 2 represents streams of data traffic transmitted in a forward data traffic channel from any one of the base transceiver stations, BTS 101–BTS 103, to any one of mobile units 111–114.

A burst of TDMA data traffic begins with a synchronization block 201 that synchronizes the receivers in mobile units 111–114 to thereby enable the mobile units to capture the data traffic following synchronization block 201. In the exemplary timing diagram 200 shown, the data traffic is broken into three phases, or time slots, that follow each other in sequence. The first phase block 202a, labeled "Phase 1," is followed by a second phase block 203a, labeled "Phase 2," which is followed in turn by a third phase block 204a, labeled "Phase 3." The Phase 1-Phase 2-Phase 3 sequence repeats until an entire frame of data traffic is transmitted. The length of a data traffic frame may vary according to the number of phases in each frame, the number of bits in each phase, and other system parameters.

When a communication link is established between a base transceiver station and one of the mobile units, control messages direct the mobile unit to receive data in one or more of Phase 1, Phase 2, or Phase 3. The number of bits in each phase may vary according to selected system parameters. For example, a phase may be only one bit wide. In such a scenario, a block of data sent to the mobile unit is converted into a data stream that is transmitted one bit at a time in Phase 1. A mobile unit operating in Phase 1 in single-phase mode reads only every third bit. In alternate embodiments, the number of bits in each phase may be greater than one bit, such as a four-bit phase or an eight-bit phase.

FIG. 3 illustrates phase and address assignments of a plurality of network users in exemplary wireless network 100 in accordance with one embodiment of the present invention. The network users are arbitrarily labeled "User A" through "User S." In the exemplary embodiment, the users may be assigned one of eight addresses within each phase. For example, User A is assigned binary address 000 in Phase 1. User B is assigned binary address 001 in Phase 1, User C is assigned binary address 010 in Phase 1, etc.

Several of the network users are assigned to receive data in more than one phase and at different addresses. For example, User A receives a data stream in Phase 1 at binary address 000 and receives a data stream in Phase 2 at binary address 010. Likewise, User B receives a data stream in Phase 1 at binary address 001 and in Phase 2 at binary address 100. User F and User M also receive data in multiple phases, although User F has binary address 101 in both phases, whereas User M receives data at different addresses in each phase.

The phase and address assignments shown in FIG. 3 illustrate the advantages of the present application. The devices used by User A through User M may be assigned addresses and phases for receiving data in a flexible manner by wireless network 100. Thus, as new users are added to the network, and old users are deleted from the network, addresses may be allocated or reallocated to selected users in each phase without reconfiguring the address and phase assignments of other users. This may be done without causing the user's mobile device to default to an all-phase mode.

Figure 4:
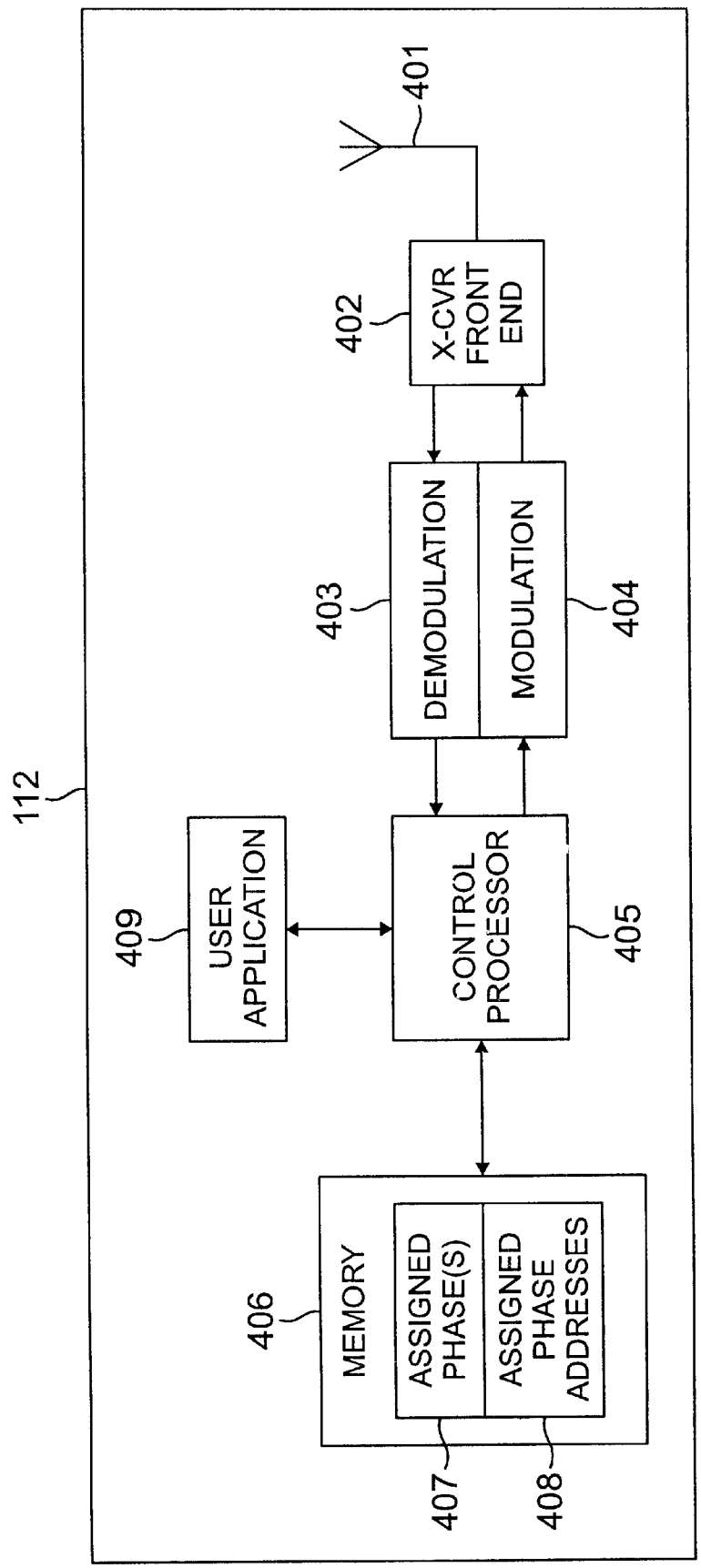
FIG. 4 illustrates an exemplary mobile unit in accordance with one embodiment of the present invention.

FIG. 4 illustrates exemplary mobile unit 112 in accordance with one embodiment of the present invention. Mobile unit 112 comprises an antenna 401, transceiver front end circuitry 402, demodulation circuitry 403 and modulation circuitry 404. Transceiver front end circuitry 402 contains low-noise amplification circuitry for amplifying forward channel RF signals received by antenna 401. The amplified forward channel RF signals are demodulated by demodulation circuitry 403, thereby recovering the baseband data traffic or control message signal that was sent in the forward channel. Modulation circuitry 404 receives data traffic and control messages from control processor 405 and modulates these signals to produce a modulated reverse channel RF signal. Transceiver front end circuitry 402 also contains power amplifiers for amplifying the modulated reverse channel RF signals received from modulation circuitry 404.

Within mobile unit 112, control processor 405 controls the flow of data traffic that is being sent and received by transceiver front end circuitry 402. Control processor 405 receives data and instructions from user application 409 and also sends data to user application 409. Control processor 405 receives forward channel data traffic and command messages from demodulation circuitry 403 and stores the received data/commands in memory 406. Control processor 405 may also store data and/or commands generated by user application 409 in memory 406 in preparation for transfer to modulation circuitry 404 and subsequent transmission in the reverse channel by transceiver front end circuitry 402.

User application 409 is intended as a "generic" representation of a user device control module that varies according to the type of mobile unit in which user application 409 is disposed. For example, if mobile unit 112 is a portable computer, user application 409 may be, for example, an operating system program, a word processing application, an e-mail application, a web browser application, or the like, or a combination of the foregoing. If mobile unit 112 is a wireless messaging device, such as a pager, user application 409 may be the user interface software and hardware that displays messages to the user and receives user inputs for transmission to wireless network 100.

Control processor 405 monitors the control channels in wireless network 100 via transceiver front end circuitry 402 and demodulation circuitry 403 in order to receive control messages from wireless network 100. When mobile unit 112 first accesses wireless network 100, control messages are sent to mobile unit 112 and control processor 405 that assign mobile unit 112 to a selected phase and a selected address in the TDMA access scheme. Control processor 405 stores the phase information in Assigned Phase(s) table 407 and stores the network address information in Assigned Phase Address table 408 in memory 406. Thereafter, control processor 405 processes data traffic received in the correct phase and having the correct address and continues to monitor the control channel for control messages that may subsequently modify the phase and address assignments of mobile unit 112.

Figure 5:
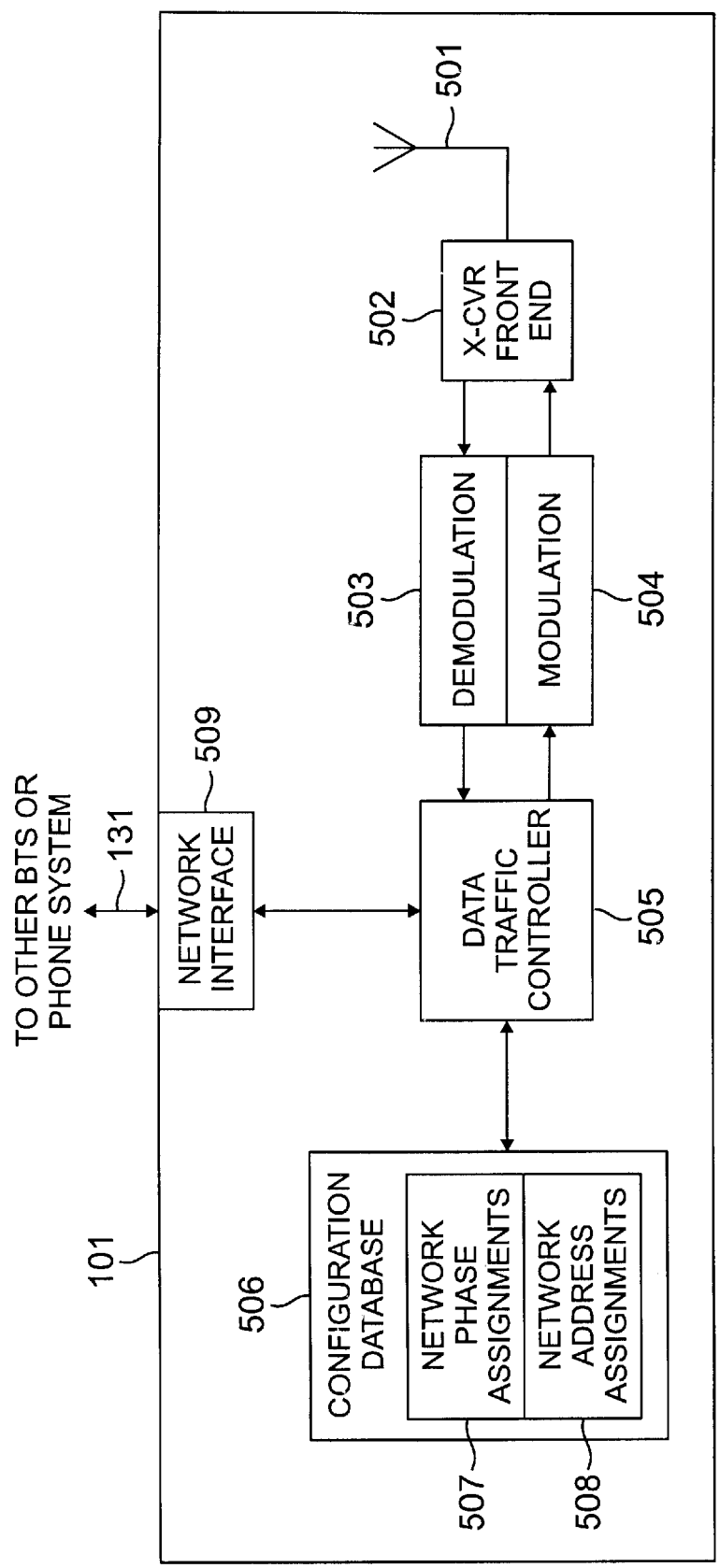
FIG. 5 is a flow chart depicting the operation of the exemplary mobile unit in FIG. 2 in accordance with one embodiment of the present invention.

FIG. 5 illustrates exemplary base transceiver station (BTS) 101 in accordance with one embodiment of the present invention. BTS 101 comprises an antenna 501, transceiver front end circuitry 502, demodulation circuitry 503 and modulation circuitry 504. Transceiver front end circuitry 502 contains low-noise amplification circuitry for amplifying reverse channel RF signals received by antenna 501. The amplified reverse channel RF signals are demodulated by demodulation circuitry 503, thereby recovering the baseband data traffic or control message signal that was sent in the reverse channel by one or more of the mobile units. Modulation circuitry 504 receives data traffic and control messages from data traffic controller 505 and modulates these signals to produce a modulated forward channel RF signal. Transceiver front end circuitry 502 also contains power amplifiers for amplifying the modulated forward channel RF signals received from modulation circuitry 504.

Within BTS 101, data traffic controller 505 controls the flow of data traffic that is being sent and received by transceiver front end circuitry 502. Data traffic controller 505 receives voice and/or data traffic destined for a mobile unit from other bases transceiver stations or the public phone system via communications line 131 and network interface 509. Data traffic controller 505 also sends voice and/or data traffic received form one or more mobile units to other base transceiver stations, to a server, or to the public phone system via communications line 131 and network interface 509.

Data traffic controller 505 is coupled to a configuration database 506 that is used to store the phase information and the address information of every mobile unit that is in communication with BTS 101. Network Phase Assignments table 507 stores the current phase assignment of each user in communication with BTS 101. Network Address Assignments table 508 stores the current address assignment in each phase of each user in communication with BTS 101. Data traffic controller 505 transmits data traffic in the correct phase and at the correct address according to the information stored in Network Phase Assignments table 507 and in Network Address Assignments table 508.

If traffic conditions require modifying the bandwidth available to a particular user, data traffic controller 505 is capable of changing phase and address data in Network Phase Assignments table 507 and in Network Address Assignments table 508. Data traffic controller 505 can then transmit the new phase and address information to the user by means of control messages in the forward control channel.

Figure 6:
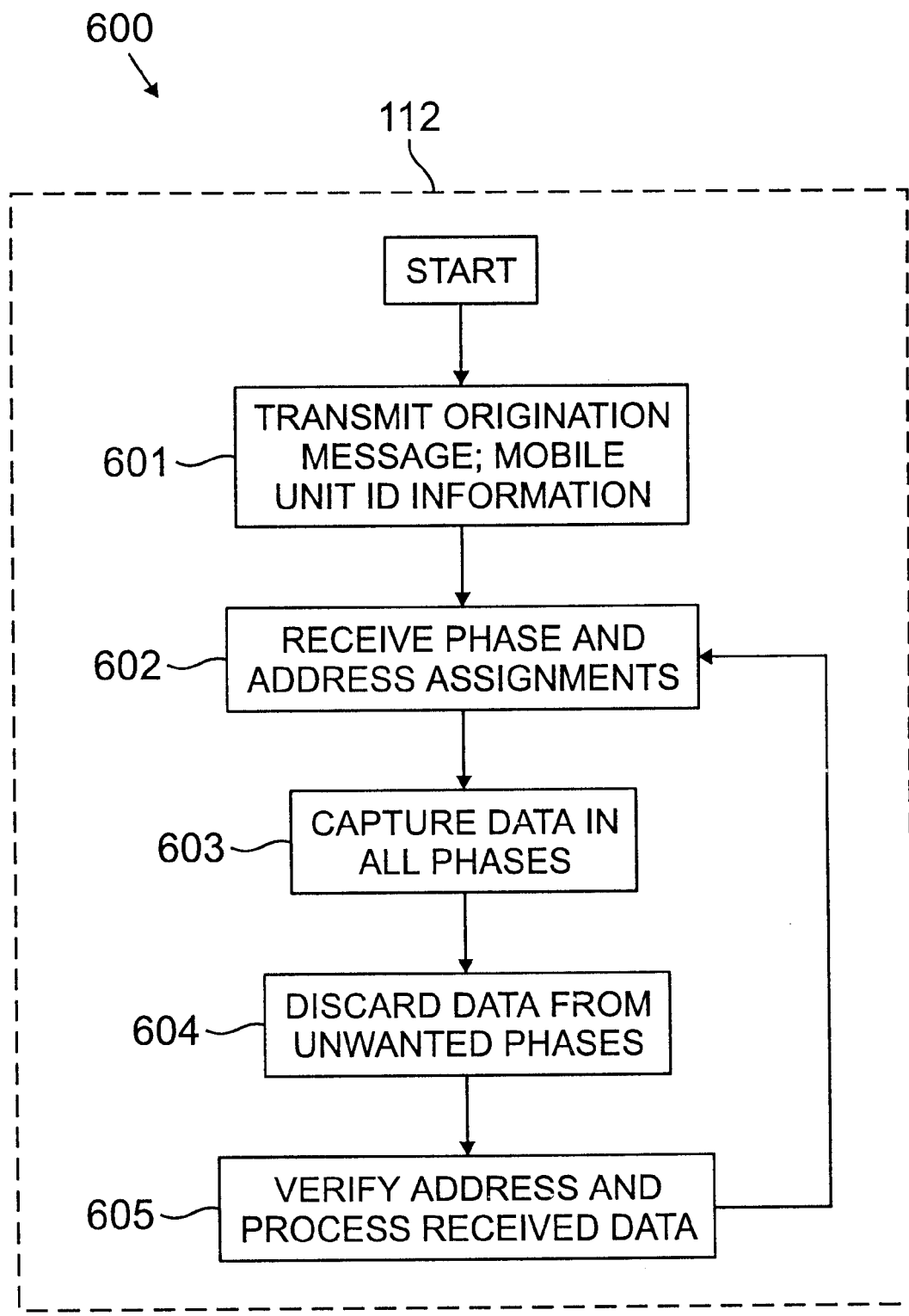
FIG. 6 is a flow chart depicting the operation of the exemplary mobile unit in FIG. 4 in accordance with one embodiment of the present invention.

FIG. 6 is a flow chart 600 depicting the operation of exemplary mobile unit 112 in FIG. 4 in accordance with one embodiment of the present invention. In an advantageous embodiment of the present invention, mobile unit 112 uses a "capture and discard" technique to receive traffic data in multiple phases and at multiple addresses. According to this technique, mobile unit 112 operates in a modified all-phase mode of operation. Mobile unit 112 therefore captures all traffic data and discards traffic data from unwanted phases.

Mobile unit 112 initiates the establishment of a communication link with wireless network 100 and BTS 101 by transmitting in a control channel an origination message that contains, or is followed by, identification (ID) information that identifies mobile unit 112 to wireless network 100 (process step 601). In response to the origination message transmitted by mobile unit 112, BTS 101 transmits a phase assignment and an address assignment to mobile unit 112. The phase assignment may initially be for single-phase mode of operation, and the address assignment may assign only one address within that single phase.

Mobile unit 112 receives the phase and address assignments from BTS 101 (process step 602) and begins to capture all data traffic in all phases of the data traffic channels (process step 603). Mobile unit 112 filters out the data traffic in the assigned phase(s) by discarding data from any unwanted phase(s) (process step 604). For example, if mobile unit 112 is assigned to receive data traffic in phase A and phase C, mobile unit 112 captures data traffic from all phases and discards the data captured from phase B. Finally, mobile unit 112 verifies the address associated with the data traffic from the assigned phases and processes the received data if the address matches the assigned address given to mobile unit 112 by BTS 101 (process step 605).

Figure 7:
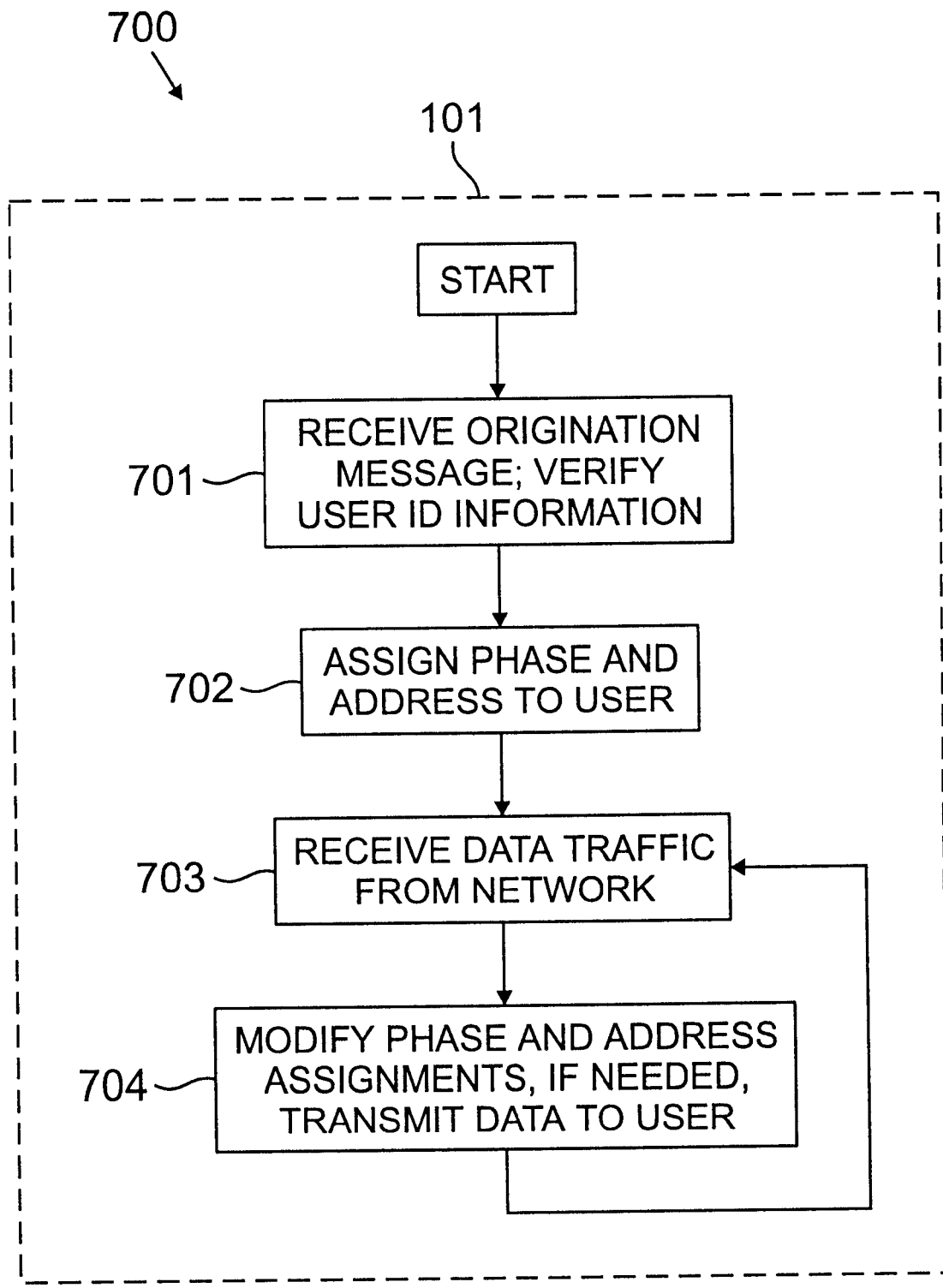
FIG. 7 is a flow chart depicting the operation of the exemplary base transceiver station in FIG. 5 in accordance with one embodiment of the present invention.

FIG. 7 is a flow chart 700 depicting the operation of BTS 101 in FIG. 5 in accordance with one embodiment of the present invention. Initially, BTS 101 receives an origination message from mobile unit 112 and verifies the ID information provided by mobile unit 112 (process step 701). If the ID information provided by mobile unit 112 indicates that mobile unit 112 is authorized to access wireless network 100, BTS 101 transmits a control channel message that assigns a phase assignment and an address assignment to mobile unit 112 (process step 702).

Thereafter, as BTS 101 receives data traffic directed to mobile unit 112 from other portions of wireless network 100 or from the public telephone system (process step 703), BTS 101 transmits the data traffic to mobile unit 112 in the assigned phase(s) and at the assigned address(es) that were previously sent to mobile unit 112 (process step 704). If the amount of data traffic directed to mobile unit 112 is large, BTS 101 may transmit control messages to mobile unit 112 directing mobile unit 112 to receive data traffic in additional phases and at different addresses within the additional phases in order to increase the bandwidth available to mobile unit 112.

Although the present invention has been described in detail, those skilled in the art should understand that they can make various changes, substitutions and alterations herein without departing from the spirit and scope of the invention in its broadest form.

What is claimed is:

1. For use in a time division multiple access (TDMA) wireless network, a wireless communications device comprising:

a receiver capable of receiving a TDMA signal transmitted from a base station in said wireless network, said TDMA signal comprising a plurality of user data streams arranged in N phases; and a data controller capable of processing said user data streams in a multi-phase mode, said multi-phase mode enabling said data controller to retrieve from M selected ones of said N phases of said TDMA signal at least one user data stream directed to said wireless communications device, where M may be greater than 1 and is less than N and wherein said M selected phases may be a periodically spaced among said N phases and wherein said data controller retrieves user data streams from all N phases and processes only data retrieved from said M selected phases.

2. The wireless communications device set forth in claim 1 wherein a value of M is modifiable.

3. The wireless communications device set forth in claim 2 wherein said value of M is modified by said base station.

4. The wireless communications device set forth in claim 1 wherein said data controller determines a transmitted user address associated with said at least one retrieved user data stream and processes said at least one retrieved user data stream if said transmitted user address is the same as an assigned user address associated with said wireless communications device.

5. The wireless communications device set forth in claim 4 wherein said assigned user address is modifiable by said base station.

6. The wireless communications device set forth in claim 1 wherein said data controller determines a first transmitted user address associated with a first one of said at least one retrieved user data stream and a second transmitted user address associated with a second one of said at least one retrieved user data stream and processes said first and second retrieved user data streams if said first and second transmitted user addresses are the same as a first assigned user address and a second assigned user address associated with said wireless communications device.

7. The wireless communications device set forth in claim 6 wherein said first assigned user address is different than said second assigned user address.

8. For use in a time division multiple access (TDMA) wireless network, a base station capable of communicating with mobile communications devices disposed in a coverage area of said base station, said base station comprising:

an interface capable of receiving user data directed to a first one of said mobile communications devices;

a transmitter capable of transmitting to said first mobile communications device a TDMA signal comprising N phases; and a data traffic controller coupled to said interface and said transmitter and capable of causing said transmitter to transmit said received user data as a user data stream arranged in M selected ones of said N phases, wherein M may be greater than one but is less than N and wherein said M selected phases maybe a periodically spaced among said N phases, such that said first mobile communications device retrieves user data streams from all N phases and processes only data retrieved from said M selected phases.

9. The base station set forth in claim 8 wherein a value of M is modifiable.

10. The base station set forth in claim 9 wherein said value of M is modified by said each base station.

11. The base station set forth in claim 8 wherein said data traffic controller causes said transmitter to transmit an assigned user address as part of said transmitted user data stream, wherein said assigned user address is associated with said first mobile communications device.

12. The base station set forth in claim 11 wherein said assigned user address is modifiable.

13. The base station set forth in claim 12 wherein said assigned user address is modifiable by said each base station.

14. The base station set forth in claim 8 wherein said data traffic controller causes said transmitter to transmit said received user data as a plurality of user data streams arranged in M selected ones of said N phases, wherein M may be greater than one but is less than N.

15. The base station set forth in claim 14 wherein said data traffic controller causes said transmitter to transmit a first assigned user address as part of first selected one of said plurality of transmitted user data streams and a second assigned user address as part of second selected one of said plurality of transmitted user data streams, wherein said first and second assigned user address are associated with said first mobile communications device and said first assigned user address is different than said second assigned user address.

16. For use in a time division multiple access (TDMA) wireless network, a method of operating a wireless communications device in a multi-phase mode, the method comprising the steps of:

receiving a TDMA signal transmitted from a base station in the TDMA wireless network, the TDMA signal comprising a plurality of user data streams arranged in N phases; and retrieving from M selected ones of the N phases of the TDMA signal at least one user data stream directed to the wireless communications device, where M may be greater than 1 and is less than N and wherein the M selected phases may be a periodically spaced among the N phases, wherein the step of retrieving comprises the sub-steps of retrieving user data streams from all N phases and processing only data retrieved from the M selected phases.

17. The method set forth in claim 16 comprising the further steps of determining a transmitted user address associated with the at least one retrieved user data stream and processing the at least one retrieved user data stream if the transmitted user address is the same as an assigned user address associated with the wireless communications device.

18. The method set forth in claim 16 wherein the assigned user address is modifiable by the base station.

* * * * *

UNITED STATES PATENT AND TRADEMARK OFFICE
CERTIFICATE OF CORRECTION

PATENT NO. : 6,539,007 B1 Page 1 of 1
APPLICATION NO. : 09/192953
DATED : March 25, 2003
INVENTOR(S) : Paul I. Reeder and Tae-Guen Park It is certified that error appears in the above-identified patent and that said Letters Patent is hereby corrected as shown below:

Column 2, line 14, delete "by" and replace with --but--;

Column 2, line 56, delete "address9es" and replace with --addresses--;

Column 9, claim 1, line 26, delete "a periodically" and replace with -- aperiodically --;

Column 10, claim 8, line 6, delete "maybe" and replace with -- may be --;

Column 10, claim 8, line 6, delete "a periodically" and replace with -- aperiodically--;

Column 10, claim 16, line 49, delete "a periodically" and replace with -- aperiodically--.

Signed and Sealed this

Twenty-fourth Day of October, 2006

JON W. DUDAS
*Director of the United States Patent and Trademark Office*